United States Patent
Carter et al.

(10) Patent No.: US 7,298,121 B2
(45) Date of Patent: Nov. 20, 2007

(54) CIRCUIT AND METHOD FOR INCREASING THE STABILITY OF SWITCH-MODE POWER SUPPLIES

(75) Inventors: Michael Carter, Clayton, NC (US); Randall L. Powers, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 234 days.

(21) Appl. No.: 11/111,139

(22) Filed: Apr. 21, 2005

(65) Prior Publication Data

US 2006/0238180 A1    Oct. 26, 2006

(51) Int. Cl.
G05F 1/40 (2006.01)
(52) U.S. Cl. ...................... 323/282; 323/285
(58) Field of Classification Search ............. 323/283, 323/284, 285, 351, 282, 288
See application file for complete search history.

(56) References Cited

U.S. PATENT DOCUMENTS 5,717,318 A * 2/1998 Matsuda et al. ............ 323/273
5,945,820 A * 8/1999 Namgoong et al. ......... 323/282
6,597,159 B2 * 7/2003 Yang ........................... 323/283

* cited by examiner

*Primary Examiner*—Jessica Han
(74) *Attorney, Agent, or Firm*—Fogg & Powers LLC; David N. Fogg; Richard J. Moura

(57) ABSTRACT

An improved circuit and method for increasing the stability of switch-mode power supplies via frequency fold-back is disclosed. For example, a circuit for increasing the stability of a switch-mode power supply using the compensation signal to control the frequency of the oscillator is disclosed, which includes an operational amplifier that functions to scale the compensation signal. Thus, the switching frequency of the power supply involved is decreased as the load is reduced. This novel use of the compensation signal to control the switching frequency of a switch-mode power supply significantly increases the stability of the power supply as compared to prior switch-mode power supplies. Therefore, the switch-mode power supply may be used for those applications where relatively high stability is desired.

20 Claims, 1 Drawing Sheet

CIRCUIT AND METHOD FOR INCREASING THE STABILITY OF SWITCH-MODE POWER SUPPLIES

RELATED APPLICATIONS

The present application is related to commonly assigned and co-pending U.S. patent application Ser. No. 11/111,138 entitled "CIRCUIT AND METHOD FOR REDUCING THE SIZE AND COST OF SWITCH-MODE POWER SUPPLIES," filed on the same date as the present application, which is incorporated herein by reference in its entirety.

FIELD OF THE INVENTION

The present invention relates generally to the power supply field, and more specifically, but not exclusively, to an improved circuit and method for increasing the stability of switch-mode power supplies.

BACKGROUND OF THE INVENTION

Switch-mode power supplies are used in a broad range of electronic applications, such as, for example, telecommunication systems, computers, television equipment, video equipment, etc., where it is important to accurately regulate a power supply output over a wide range of loads. Some advantages of switch-mode power supplies over other types of regulated power supplies (e.g., linear power supplies) are that they are smaller, weigh less, consume less power, and are highly efficient compared to many other types of regulated power supplies.

In numerous applications, switch-mode power supplies must operate with stability over a very wide range of loads. One technique used for operating such switch-mode power supplies over very wide ranges of loads is to fold back the switching frequency in response to decreases in the loads. However, in certain applications, the switch-mode power supply may be operated as a current source instead of as voltage source. Stability in this mode of operation is much more difficult to achieve.

Valid loads for voltage source switch-mode power supplies typically range from some non-zero minimum to some predetermined maximum. Short circuits are typically handled by turning off the power supply and retrying to start periodically. Valid loads for power supplies operating in current source mode range from open circuit to short circuit. The power supply is not permitted to power cycle and must provide a stable current/voltage at all loads. Typically, current source mode power supplies have a maximum output voltage they will put out at open circuit. This protects the power supply components from excessive voltages. The conditions of open circuit and short circuit represent opposite ends of the load spectrum, but both conditions are very light loads on a current source power supply. Maximum load occurs halfway in between where the output voltage and current are at their maximum.

One technique used to increase stability over a very wide load range is to lower the power supply switching frequency at light loads. An existing technique used to perform this frequency fold-back in switch-mode power supplies is to add a winding to the power transformer that is ratioed to the output voltage of the supply involved. This voltage is then used as an input to a voltage controlled oscillator. This technique can be used readily with a voltage source, where the output voltage varies linearly from minimum load to maximum load. However, this added winding frequency fold-back technique cannot be used with a current source, because the minimum load condition for a current source occurs at both ends of the load spectrum: full output voltage and no output voltage.

As such, another technique was derived to perform frequency fold-back with a current source mode switch-mode power supply. Every switch-mode power supply has at least one error amplifier to sense the value of the output and compare it to a reference value. The result of this comparison is commonly referred to as the compensation signal. The compensation signal is proportional to the output load in both current source mode and voltage source mode power supplies. This technique takes this compensation signal, scales it, and uses it to control the power supply's oscillator. The lower frequency at lighter loads improves the stability of the control loop under these conditions.

Notwithstanding the distinct advantages of the above-described technique, it would be advantageous to have a switch-mode power supply that is even more stable than prior switch-mode power supplies. As described in detail below, the present invention provides an improved switch-mode power supply that is more stable than prior switch-mode power supplies.

SUMMARY OF THE INVENTION

The present invention provides an improved circuit and method for implementing frequency fold-back in switch-mode power supplies. In accordance with a preferred embodiment of the present invention, a circuit and method for controlling the switching frequency of the oscillator for a switch-mode power supply is provided. This novel use by the present invention of using the compensation signal to control the switching frequency of a switch-mode power supply significantly increases the stability of the power supply as compared to prior switch-mode power supplies. As such, in accordance with the present invention, a switch-mode power supply may be used for those applications where relatively high stability is desired.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
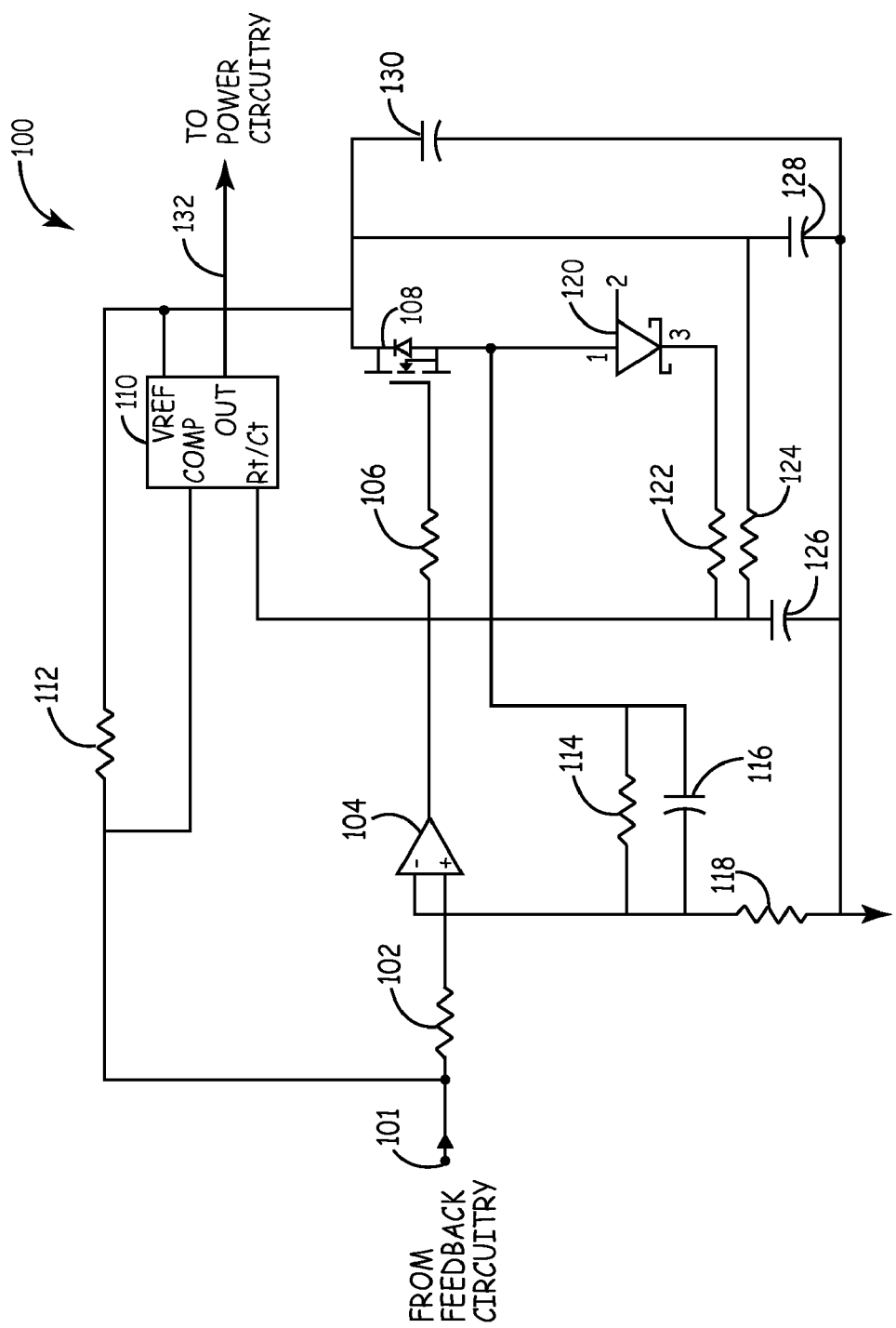
FIG. 1 depicts a schematic diagram of an example electronic circuit that can be used to control the frequency of the oscillator for a switch-mode power supply, in accordance with a preferred embodiment of the present invention.

With reference now to the figures, FIG. 1 depicts a schematic diagram of an example electronic circuit 100 that can be used to control the frequency of the oscillator for a switch-mode power supply, in accordance with a preferred embodiment of the present invention. For this example embodiment, circuit 100 includes a resistor 102 coupled to an input connection 101 of circuit 100. Input connection 101 is connected to feedback circuitry (not shown) that produces a compensation signal that indicates the loading of the power supply involved. The other side of resistor 102 is connected to an input of an operational amplifier 104. Thus, a voltage at input connection 101 is coupled to the positive input of operational amplifier 104. For this example, resistor 102 may be implemented with a 30.1 KΩ (1% tolerance) resistor, and operational amplifier 104 may be implemented with an LM 2904 operational amplifier.

The negative input of operational amplifier 104 is connected to one side of a resistor 114, a resistor 118, and a capacitor 116. The other side of resistor 118 is connected to circuit ground. The other sides of resistor 114 and capacitor 116 are connected together, to a source of a Field-Effect Transistor (FET) 108, and to the anode of a diode 120. The output of operational amplifier 104 is connected to a resistor 106, and the second side of resistor 106 is connected to the gate of transistor 108. As such, for this example embodiment, resistors 106, 114 and 118 may be implemented with, respectively, 68.1Ω, 100 KΩ, and 49.9 KΩ resistors (e.g., all with 1% tolerance), and capacitor 116 may be implemented with a 0.1 μF capacitor (e.g., rated for 50V). Also, for this example, transistor 108 may be implemented with a 2N7002 transistor.

The cathode of diode 120 is connected to a resistor 122. The second side of resistor 122 feeds into a resistor 124 and a capacitor 126, which sets the switching frequency of the control chip 110. The other side of capacitor 126 is connected to circuit ground. The other side of resistor 124 is connected to a capacitor 128, a capacitor 130, the collector of transistor 108, a resistor 112, and a voltage reference (VREF) input of control chip 110. The other sides of capacitors 128 and 130 are connected to circuit ground. The other side of resistor 112 is connected to input connection 101 and resistor 102, and to a compensation (COMP) input of control chip 110. Resistor 112 functions as a pull-up resistor for the compensation circuitry output. An output connection of control chip 110 is coupled to power circuitry (not shown) for a power supply. As such, for this example embodiment, resistors 112, 122 and 124 may be implemented, respectively, with a 2.21 KΩ resistor, a 16.9 KΩ resistor, and an 86.6 KΩ resistor (e.g., all having a tolerance of 1%). Also, for this example, capacitors 126, 128 and 130 may be implemented, respectively, with a 390 pF capacitor (e.g., rated at 100V), a 0.1 μF capacitor (e.g., rated at 50V), and another 0.1 μF capacitor (e.g., also rated at 50V). The control chip (e.g., oscillator device) 110 may be implemented, for example, as part of a UCC3813 Pulse Width Modulation (PWM) control chip. Note that capacitors 128 and 130 may be provided for noise suppression in a practical application as shown, but these components are not required to practice the invention and do not limit the scope of the invention in any way.

In operation, circuit 100 can receive a compensation signal at input 101, which is a voltage that indicates the loading of the power supply involved. A compensation signal received at input 101 is developed across resistor 102 and applied as a voltage to the positive input of operational amplifier 104. The output signal from operational amplifier 104 is applied to the gate of transistor 108 through resistor 106. As the compensation signal voltage at input connection 101 is increased, the voltage applied to the gate of transistor 108 is increased. As transistor 108 is turned on, it develops a voltage across resistor 122 through diode 120. This voltage across resistor 120 produces a current that sums with current coming from the voltage across resistor 124. These currents charge capacitor 126. The (PWM) control chip 110 provides the thresholds at which capacitor 126 discharges through control chip 110. This output signal from operational amplifier 104 is also developed across resistor 124 and capacitor 126 and applied to the Rt/Ct input connection of control chip 110. Transistor 108 and diode device 120 function to limit the current summed into the oscillator capacitor 126. This limits the range over which the frequency fold-back circuit can vary the switching frequency. Therefore, in accordance with the principles of the present invention, operational amplifier 104 functions to suitably scale the compensation signal to control the frequency of the oscillator implemented in control chip 110. Importantly, this novel use by the present invention of the compensation signal to control the switching frequency of a switch-mode power supply significantly increases the stability of the power supply as compared to prior switch-mode power supplies. As such, in accordance with the present invention, a switch-mode power supply may be used for those applications where relatively high stability is desired, such as, for example, to provide a highly stable 60 mA current source for a T1 communication line.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A frequency control circuit for a switch-mode power supply, comprising:
    an oscillator device, an output of said oscillator device operable to set a frequency of said switch-mode power supply;
    a storage device coupled to a switching rate input of said oscillator device;
    a transistor device, an output of said transistor device coupled to said storage device, said transistor device operable to increase or decrease a level of a signal stored in said storage device, and responsive to said increase or decrease of said level of said signal, increase or decrease a switching rate of said oscillator device; and
    an amplifier device, an input of said amplifier device operable to receive a signal indicating a load condition for said switch-mode power supply, and an output of said amplifier device coupled to an input of said transistor device.

2. The frequency control circuit of claim 1, further comprising:
    a diode device coupled to an emitter of said transistor device, said diode device operable to limit voltage at said output of said transistor device to a predetermined level.

3. The frequency control circuit of claim 1, wherein said amplifier device is operable to scale said signal indicating a load condition for said switch-mode power supply and control said frequency of said oscillator device.

4. The frequency control circuit of claim 1, wherein said signal indicating a load condition for said switch-mode power supply comprises a compensation signal from a feedback circuit associated with said switch-mode power supply.

5. The frequency control circuit of claim 1, wherein said oscillator device comprises an oscillator device in a switch-mode power supply semiconductor chip.

6. The frequency control circuit of claim 1, wherein said transistor device comprises a Field-Effect Transistor.

7. The frequency control circuit of claim 1, wherein said storage device comprises a capacitor.

8. A frequency control circuit for a switch-mode power supply, comprising:
   a voltage or current controlled oscillator for said switch-mode power supply;
   means for receiving a first signal indicating a load condition for said switch-mode power supply;
   means, coupled to said means for receiving, for generating a second signal indicating an increase or decrease in said load condition for said switch-mode power supply;
   means, coupled to said means for generating, for storing said second signal indicating said increase or decrease in said load condition for said switch-mode power supply; and
   means, coupled to said means for storing, for increasing or decreasing a switching rate of said voltage or current controlled oscillator responsive to said second signal.

9. The frequency control circuit of claim 8, further comprising:
   means for limiting a voltage to a predetermined level, said voltage being output from said means for generating and associated with said first signal indicating a load condition for said switch-mode power supply.

10. The frequency control circuit of claim 8, wherein said means for generating comprises an amplifier device operable to scale said first signal indicating a load condition for said switch-mode power supply and control said frequency of said oscillator.

11. The frequency control circuit of claim 8, wherein said first signal indicating a load condition for said switch-mode power supply comprises a compensation signal from a feedback circuit associated with said switch-mode power supply.

12. The frequency control circuit of claim 8, wherein said voltage or current controlled oscillator comprises an oscillator device arranged in a switch-mode power supply semiconductor chip.

13. The frequency control circuit of claim 8, further comprising a transistor device and a diode device operable to limit a voltage to a predetermined level, said voltage being output from said means for generating and associated with said first signal indicating a load condition for said switch-mode power supply.

14. The frequency control circuit of claim 8, wherein said means for generating comprises an operational amplifier.

15. A method for frequency control in a switch-mode power supply, comprising the steps of:
   receiving a first signal indicating a load condition for said switch-mode power supply;
   generating a second signal indicating an increase or decrease in said load condition for said switch-mode power supply;
   storing said second signal indicating said increase or decrease in said load condition for said switch-mode power supply;
   coupling said stored second signal to an input of a voltage or current controlled oscillator device; and
   increasing or decreasing a switching rate of said voltage or current controlled oscillator device responsive to said second signal.

16. The method of claim 15, further comprising the steps of:
   coupling a diode device to an output an amplifier device;
   coupling said amplifier device to a frequency control input of said voltage or current controlled oscillator device; and
   limiting a voltage at said output of said amplifier device to a predetermined level.

17. The method of claim 15, further comprising the steps of:
   scaling said first signal indicating a load condition for said switch-mode power supply; and
   controlling a frequency of said voltage or current controlled oscillator device responsive to the scaling step.

18. The method of claim 15, wherein said first signal indicating a load condition for said switch-mode power supply comprises a compensation signal from a feedback circuit associated with said switch-mode power supply.

19. The method of claim 15, wherein said voltage or current controlled oscillator device comprises an oscillator device arranged in a switch-mode power supply semiconductor chip.

20. The method of claim 15, wherein the generating step is performed by an operational amplifier.

* * * * *